(12) United States Patent
Asahara et al.

(10) Patent No.: US 11,994,454 B2
(45) Date of Patent: May 28, 2024

(54) PARTICLE BEAM EXPERIMENT DATA ANALYSIS DEVICE

(71) Applicants: Hitachi, Ltd., Tokyo (JP); TOYOTA JIDOSHA KABUSHIKI KAISHA, Toyota (JP)

(72) Inventors: Akinori Asahara, Tokyo (JP); Hidekazu Morita, Tokyo (JP); Takuya Kanazawa, Tokyo (JP); Kanta Ono, Tsukuba (JP); Masao Yano, Toyota (JP); Tetsuya Shoji, Toyota (JP)

(73) Assignees: HITACHI, LTD., Tokyo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 402 days.

(21) Appl. No.: 17/605,065

(22) PCT Filed: Apr. 24, 2020

(86) PCT No.: PCT/JP2020/017587
§ 371 (c)(1),
(2) Date: Oct. 20, 2021

(87) PCT Pub. No.: WO2020/218462
PCT Pub. Date: Oct. 29, 2020

(65) Prior Publication Data
US 2022/0187180 A1    Jun. 16, 2022

(30) Foreign Application Priority Data

Apr. 26, 2019  (JP) ................................ 2019-085277

(51) Int. Cl.
*G01N 15/0205* (2024.01)
*G01N 23/201* (2018.01)

(52) U.S. Cl.
CPC ....... *G01N 15/0211* (2013.01); *G01N 23/201* (2013.01)

(58) Field of Classification Search
CPC ............ G01N 15/1429; G01N 23/201; G01N 15/0211; G01N 23/2055; G01N 2223/054;
(Continued)

(56) References Cited

U.S. PATENT DOCUMENTS 7,154,993 B2 *  12/2006  Ulyanenkov .......... G01N 23/20
                                                378/86
10,156,435 B1 * 12/2018  Taniguchi ................ G01B 7/28
(Continued)

FOREIGN PATENT DOCUMENTS

JP    2003-202305 A    7/2003
JP    2004-347502 A   12/2004
(Continued)

OTHER PUBLICATIONS

Particle size analysis—Small-angle X-ray scattering, ISO 17867:2015.
International Search Report of PCT/JP2020/017587 dated Jul. 28, 2020.
Chinese Office Action received in corresponding Chinese Application No. 202080028677.X dated Sep. 6, 2023.

*Primary Examiner* — An H Do
(74) *Attorney, Agent, or Firm* — MATTINGLY & MALUR, PC

(57) ABSTRACT

Automated analysis of particle beam measurement results is facilitated by a device that calculates a spatial parameter distribution representing spatial structure of a sample based on a scattering pattern corresponding to projection of the spatial structure of the sample to wavenumber space, the projection being obtained by detecting scattering of a particle beam which enters the sample and intersects with the sample. The device includes a section to provide estimates for signals on the scattering pattern in association with at which point on a spatial parameter distribution of the sample (Continued)

interactions occur during scattering; a section to aggregate estimation results of the interaction estimation section to calculate a spatial parameter distribution of a sample matching an aggregated result; and a section to perform alternately and repeatedly estimation in the interaction estimation section and calculation in the parameter distribution calculation section in order to improve estimation accuracy in spatial parameter distributions.

12 Claims, 20 Drawing Sheets

(58) Field of Classification Search
CPC ..... G01N 2015/1493; G01N 2223/641; G06N 7/01
See application file for complete search history.

(56) References Cited

U.S. PATENT DOCUMENTS

| | | | |
|---|---|---|---|
| 10,624,612 B2* | 4/2020 | Sumi | G01N 29/0654 |
| 10,837,768 B2* | 11/2020 | Hagihara | G01N 23/201 |
| 2004/0066893 A1 | 4/2004 | Ito et al. | |
| 2009/0210366 A1 | 8/2009 | Sakata et al. | |

FOREIGN PATENT DOCUMENTS

| | | |
|---|---|---|
| JP | 2017-116330 A | 6/2017 |
| JP | 2019-56587 A | 4/2019 |
| WO | 2007/066787 A1 | 6/2007 |

* cited by examiner

PARTICLE BEAM EXPERIMENT DATA ANALYSIS DEVICE 100

| ITEM NAME | CONTENTS |
|---|---|
| EXPERIMENT ID (601) | IDENTIFIER FOR UNIQUELY IDENTIFYING EXPERIMENT |
| DETECTOR ID (603) | ID FOR IDENTIFYING DETECTOR (501) |
| COUNT (604) | THE NUMBER OF EVENTS DETECTED |

| ITEM NAME | CONTENTS |
|---|---|
| EXPERIMENT ID (701) | IDENTIFIER FOR IDENTIFYING ATTEMPT OF SCATTERING EXPERIMENT |
| WAVENUMBER (702) | VALUE OF WAVENUMBER PARAMETER (nm$^{-1}$) |
| COUNT (703) | DUPLICATION OF THE NUMBER OF EVENTS IN (604) |

| ITEM NAME | CONTENTS |
|---|---|
| EXPERIMENT ID (801) | IDENTIFIER FOR IDENTIFYING ATTEMPT OF SCATTERING EXPERIMENT |
| GRAIN SIZE (802) | GRAIN SIZE VALUES DEFINED AT PREDETERMINED INTERVALS |
| SELECTION PROBABILITY π (803) | PROBABILITY OF OCCURRENCE OF SCATTERING IN THE GRAIN SIZE |

| ITEM NAME | CONTENTS |
|---|---|
| EXPERIMENT ID (901) | IDENTIFIER FOR IDENTIFYING ATTEMPT OF SCATTERING EXPERIMENT |
| GRAIN SIZE (902) | GRAIN SIZE VALUES DEFINED AT PREDETERMINED INTERVALS. SAME VALUE AS (802) |
| EXPECTED VALUE z OF THE NUMBER OF TIMES THAT SCATTERING OCCURS (903) | EXPECTED VALUE OF THE NUMBER OF TIMES THAT SCATTERING OCCURS IN THE GRAIN SIZE WHEN INPUT COUNT DISTRIBUTION DATA IS OBTAINED |

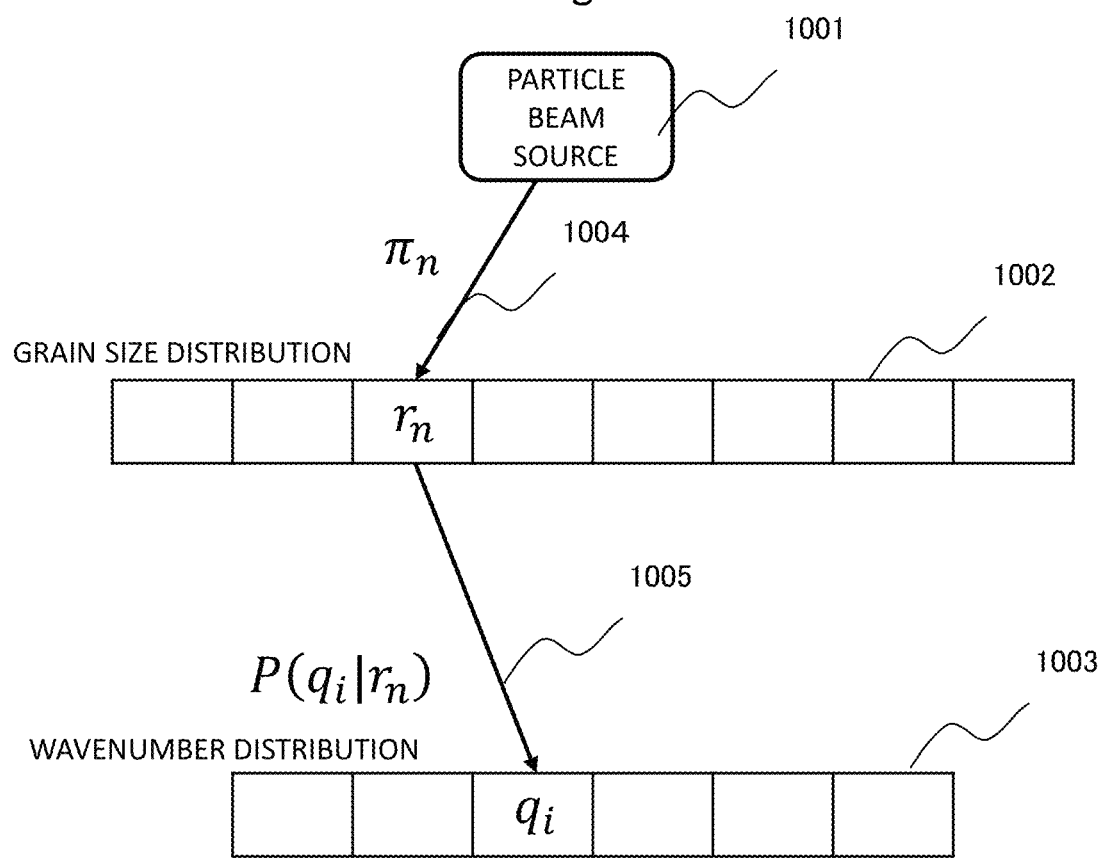

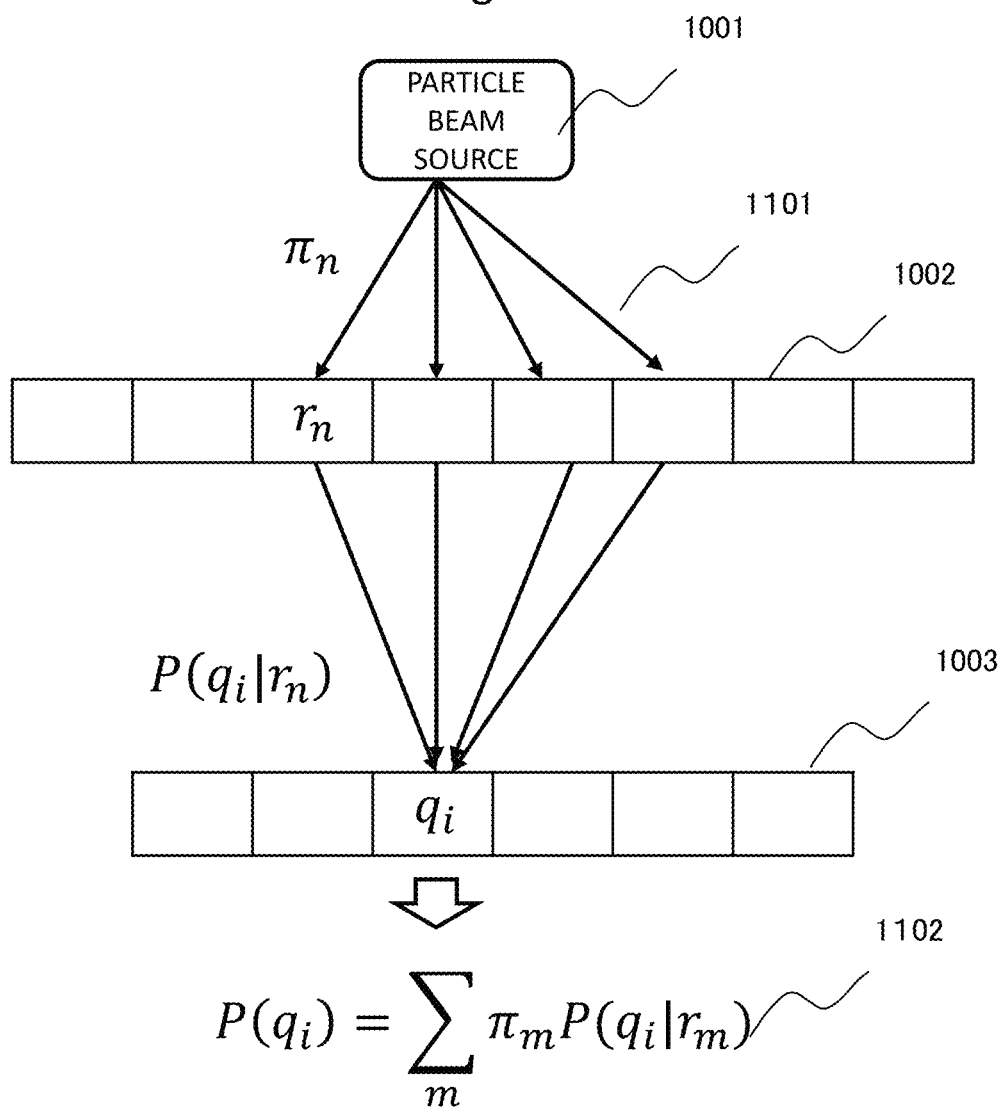

| ITEM NAME | CONTENTS |
|---|---|
| EXPERIMENT ID (701) | IDENTIFIER FOR IDENTIFYING ATTEMPT OF SCATTERING EXPERIMENT |
| DEVIATION ANGLE (1701) | DEVIATION ANGLE RELEVANT TO THE DATA |
| WAVENUMBER (702) | VALUE OF WAVENUMBER PARAMETER ($nm^{-1}$) |
| COUNT (703) | DUPLICATION OF THE NUMBER OF EVENTS IN (604) |

| ITEM NAME | CONTENTS |
|---|---|
| EXPERIMENT ID (801) | IDENTIFIER FOR IDENTIFYING ATTEMPT OF SCATTERING EXPERIMENT |
| DEVIATION ANGLE (1801) | DEVIATION ANGLE RELEVANT TO THE DATA |
| GRAIN SIZE (802) | GRAIN SIZE VALUES DEFINED AT PREDETERMINED INTERVALS |
| SELECTION PROBABILITY π (803) | PROBABILITY OF OCCURRENCE OF SCATTERING IN THE GRAIN SIZE |

| ITEM NAME | CONTENTS |
|---|---|
| EXPERIMENT ID (901) | IDENTIFIER FOR IDENTIFYING ATTEMPT OF SCATTERING EXPERIMENT |
| DEVIATION ANGLE | DEVIATION ANGLE RELEVANT TO THE DATA |
| GRAIN SIZE (902) | GRAIN SIZE VALUES DEFINED AT PREDETERMINED INTERVALS. SAME VALUE AS (802) |
| EXPECTED VALUE $z$ OF THE NUMBER OF TIMES THAT SCATTERING OCCURS (903) | EXPECTED VALUE OF THE NUMBER OF TIMES THAT SCATTERING OCCURS IN THE GRAIN SIZE WHEN INPUT COUNT DISTRIBUTION DATA IS OBTAINED ($z$ in formula 2) |

2001

PARTICLE BEAM EXPERIMENT DATA ANALYSIS DEVICE

TECHNICAL FIELD

The present invention relates to technologies to analyze results of experiments using particle beams.

BACKGROUND ART

Scattering experiments using particle beams are widely used mainly in the material science field as techniques to observe the microstructure of a substance. The term "particle beam" as used herein refers to a proton beam ($\alpha$ ray), an electron beam ($\beta$ ray), a muon beam, a photon beam (i.e., electromagnetic wave, $\gamma$ ray, x ray, visible light, infrared, and the like), a neutron beam, a neutrino beam, and the like. In the particle beam experiments, a sample such as metal or the like is irradiated with such particle beams, then the outputs of the particle beams, which have been reflected, transmitted and/or scattered, and the like (in some cases, particles differing from incoming particles may be output), are measured by a chemical or mechanical detector, and then, from a distribution profile of the intensities (the number of particles measured), nanometer scale microstructure of the sample is estimated. It is noted that similar measurements may be performed on any substance even if it can be measured by use of a frequency such as of a sound wave or the like as long as handling as particles is allowed.

The process in the scattering experiment until the particles entering the sample interact with microstructures inside the sample (hereinafter referred to as "scattering bodies") to be scattered is formulated as quantum mechanical wave function dynamics. Therefore, the intensity distribution of the particle beam after scattered may be calculated as a function dependent on a change in vector of a scattering angle, i.e., wavenumber ($1/2\pi$ of frequency) of a wave function, and spatial structure such as a size of the scattering bodies and/or the like. Thus, the function is used to reconstruct the information on the scattering bodies from the intensity distribution of the scattered particle beam. However, the calculation is not easy because it is impossible to formulate an inverse function. Therefore, there is a need for a solution for solving the inverse problem using estimation.

As similar technologies, the super-resolution techniques are well known to estimate a higher resolution image from a plurality of photo images capturing the same subject. The tomology techniques are also known to take a photograph of a subject from various directions and then to restore three-dimensional structure from the resulting images. These techniques are similar in obtaining subject information from the measurement results, to the inverse estimation problem of scattering experiments. However, they are a technique which makes combined use of multiple pieces of information in order to minimize signal degradation in the measurement process. Accordingly, they cannot be applied because they differ in conditions such as, e.g., the unnecessity of multiple pieces of information and the like, from a technique that requires a complicated process through which hard-to-measure microstructure is projected to another observable information (i.e., wavenumber distribution) for measurement as in the case of the scattering experiment.

CITATION LIST

Patent Literature

PTL 1: Japanese Patent Application Laid-Open No. 2017-116330

Non-Patent Literature

NPL 1: ISO 17867:2015 "Particle size analysis-Small-angle X-ray scattering"

SUMMARY OF INVENTION

Technical Problem

NPL 1 discloses the method based on Monte Carlo Method as a method for calculating information on scattering bodies from the scattering experiment results. Monte Carlo Method is the method that calculates a scattering pattern while randomly changing quantity relating to the spatial structure, and seeks conditions in which a difference from a measurement result becomes smaller. In the method, due to a random change in parameter, enormous amounts of calculation time are required until a correct result is reached. Also, due to the randomness, the obtained result is not always correct.

PTL 1 discloses the method that uses function fitting to determine a size distribution of the scattering bodies from a two-dimensional scattering pattern. In the method, the size distribution of the scattering bodies is expressed with the addition of a result obtained by multiplying a simple and easy-to-calculate distribution function (base function) by a factor, and the factor is determined to reduce the difference from the measurement result. As a base function, a rectangular function taking one in a particular section and otherwise zero is often used and an estimation calculation in this case is called an indirect Fourier transform. However, the method has a problem of incapability of obtaining a proper result when the size distribution function for the scattering bodies is not appropriately expressed by the addition of the base function. In the case of using a larger number of base functions to express the size distribution function for the scattering bodies, for example, in the case of indirect Fourier transform, a method of reducing the width of a rectangular function is possible. However, this may bring about an increase of the number of factors to be decided, resulting in incomplete decision. Although the decision can be achieved by adding some constraint to the factor, the constraint must be determined whenever needed from conditions obtained as previous knowledge at the time of analysis, for example, smoothness assumed in the size distribution of the scattering bodies, and/or the like. In this way, the analysis work by an expert with sufficient underlying knowledge regarding scattering bodies is absolutely necessary, which in turn leads to the difficulty of automatizing the analysis.

Solution to Problem

A preferred aspect of the present invention provides a device to calculate a spatial parameter distribution representing spatial structure of a sample based on a scattering pattern corresponding to projection of the spatial structure of the sample to wavenumber space, the projection being obtained by detecting scattering of a particle beam which enters the sample and intersects with the sample. The device includes: an interaction estimation section to provide estimates for signals on the scattering pattern in association with at which point on a spatial parameter distribution of the sample interactions occur during scattering; a parameter distribution calculation section to aggregate estimation results of the interaction estimation section to calculate a spatial parameter distribution of a sample matching an aggregated result; and a spatial parameter accuracy improvement calculation section to perform alternately and repeatedly estimation in the interaction estimation section and calculation in the parameter distribution calculation section in order to improve estimation accuracy in spatial parameter distributions. The particle beam measurement results analysis device is provided and configured as described above.

Another preferred aspect of the present invention provides a particle beam measurement results analysis method executed by an information processing device. The method includes: a first step of generating observation data from experiment data obtained from scattered particles observed after a particle beam enters a sample; a second step of calculating an expected value z of a number of times that scattering occurs, for each grain size r by use of the observation data and a selection probability $\pi$ which is a probability of selecting a grain size r in which the scattered particles are scattered; and a third step of calculating the selection probability $\pi$ by use of the expected value z. The second step and the third step are repeated.

Advantageous Effects of Invention

Even a person who is not an expert with sufficient underlying knowledge regarding scattering bodies becomes able to carry out analysis work, thus automated analysis is facilitated.

BRIEF DESCRIPTION OF DRAWINGS

FIG. 6 is a table illustrating an example data structure for particle beam experiments according to Example 1.

FIG. 7 is a table illustrating an example data structure for wavenumber distribution according to Example 1.

FIG. 8 is a table illustrating an example data structure for grain size distribution according to Example 1.

FIG. 9 is a table illustrating an example data structure for expected values of the number of times that scattering occurs, according to Example 1.

FIG. 10 is a principle schematic diagram (part 1) according to Example 1.

FIG. 11 is a principle schematic diagram (part 2) according to Example 1.

FIG. 17 is a table illustrating an example data structure for wavenumber distribution according to Example 2.

FIG. 18 is a table illustrating an example data structure for grain size distribution according to Example 2.

FIG. 19 is a table illustrating an example data structure for expected values of the number of times that scattering occurs, according to Example 2.

DESCRIPTION OF EMBODIMENTS

Figure 1:
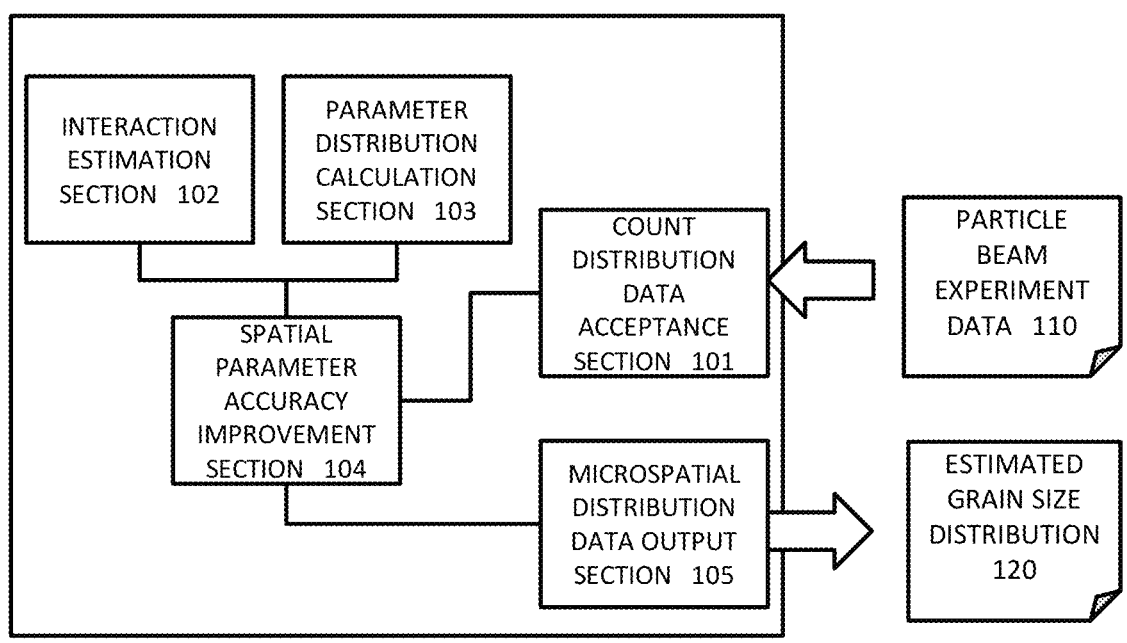
FIG. 1 is a function block diagram illustrating configuration overview according to Example 1 of embodiments.

Embodiments will be described in detail with reference to the accompanying drawings. In this regard, the present invention should not be construed as being limited to details of the following embodiments. Those of ordinary skill in the art will readily understand that any specific configuration described herein can be changed without deviating from the scope and spirit of the present invention.

In any configuration according to the present invention described below, like reference signs are used in common among different drawings to indicate the same components or components having similar functions, and a duplicate description may be omitted in some cases.

If there are a plurality of elements having the same or similar function, different suffixes may be added to the same reference sign for description. However, if there is no need to distinguish the plurality of elements from one another, the description may be given without the suffix.

The terms such as "first", "second", "third", and the like used in the specification and the like are used to identify elements, and thus are not necessarily intended to limit the number, the order or contents of the elements. Numbers for identification of elements are also used in each context, and a number used in one context does not necessarily indicate the same configuration in another context. Further, an element identified by one number is not precluded from serving as a function of an element identified by another number.

For the purpose of aiding in the understanding of the present invention, a position, a size, a shape, a range, and the like of each component illustrated in drawings and the like may not be expressed as actual position, size, shape, range, and the like. Therefore, the present invention is not necessarily limited to a position, size, shape, range, and the like disclosed in the drawings and the like.

One of features in example embodiments described below in detail is in that, for an experiment device in which a sample is irradiated with particle beams and the number of particles scattered by the irradiation is counted, a solution is obtained by reducing to a maximum likelihood estimation problem for a selection probability of scattering subject, in experiments in which particle beams are used to project spatial structure to a wavenumber space for measurement.

Example 1

FIG. 1 is example configuration according to Example 1 of embodiments of the present invention. A particle beam experiment data analysis device (100) according to Example 1 has: a count distribution data acceptance section (101) that accepts and process particle beam experiment data (110) which is a particle beam experiment result; an interaction estimation section (102) that estimates information on scattering bodies interacting in the scattering process, based on provided parameters; a parameter distribution calculation section (103) that obtains, based on a result of the interaction estimation section (102), a parameter of microspatial structure; a spatial parameter accuracy improvement section (104) that alternately invoke the interaction estimation section (102) and the parameter distribution calculation section (103); and a microspatial distribution data output section (105) that outputs the estimated result as an estimated grain size distribution (120).

Figure 2:
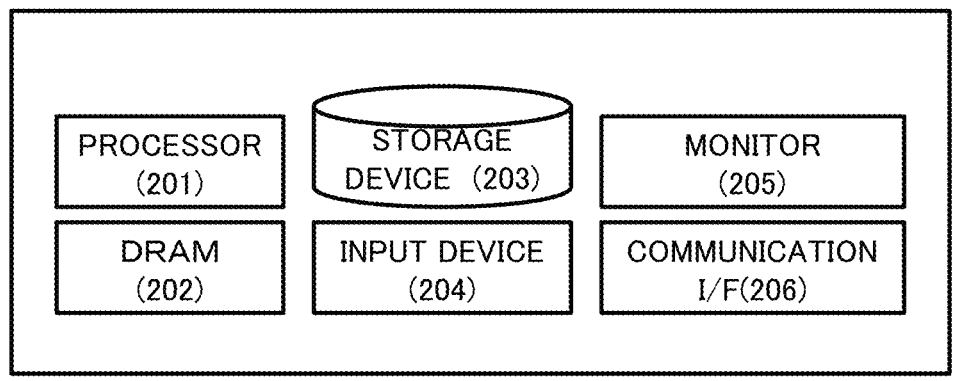
FIG. 2 is a hardware block diagram illustrating an example configuration of physical implementation according to Example 1.

FIG. 2 illustrates example configuration of physical implementation according to Example 1. The particle beam experiment data analysis device (100) includes: a processor (201) with computing power; DRAM (Dynamic Random Access Memory) (202) which is temporary volatile memory area with fast reading and writing speeds; a storage device (203) which is a permanent memory area using HDD (Hard Disk Drive), Flash memory and/or the like; an input device (204) such as a mouse, a keyboard, a control console and/or the like for operation: an output device (205) such as a monitor and/or the like for showing an experimenter the results, experiment conditions and/or the like; and an interface (206) such as a serial port and/or the like for external communication.

The particle beam experiment data analysis device (100) may be implemented using a typical computer and may be configured by hardware well-known as a computer. The count distribution data acceptance section (101), interaction estimation section (102), parameter distribution calculation section (103), spatial parameter accuracy improvement section (104), and the microspatial distribution data output section (105) are the function blocks illustrated in FIG. 1, and each of them may implement predetermined processing in cooperation with another hardware by the processor (201) executing programs recorded in DRAM (202) or the storage device (203). A program or a function thereof executed by a computer or means for implementing the function may be referred to as a "function", "means", "section", "unit", "module", or the like in some cases.

The above configuration illustrated in FIG. 2 may be configured by a single computer or alternatively may have any portion configured by another computer connected via a network. In the example, a function equivalent function configured by software may also be implemented by hardware such as FPGA (Field Programmable Gate Array), ASIC (Application Specific Integrated Circuit) and/or the like.

Figure 3:
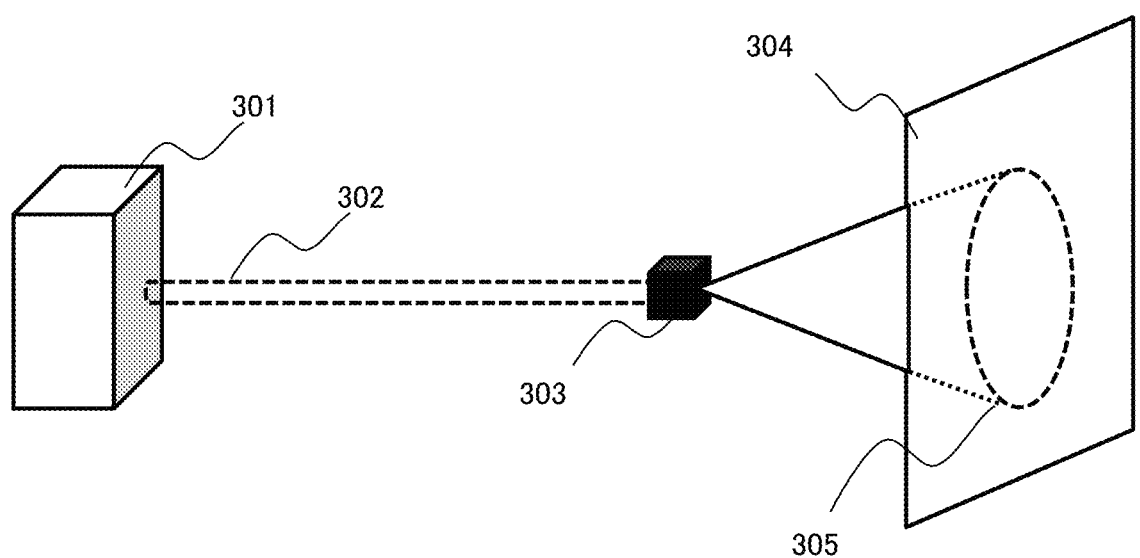
FIG. 3 is a conceptual diagram of an example of particle beam scattering experiments.

FIG. 3 illustrates a conceptual diagram of a particle beam small angle scattering experiment assumed in Example 1. In FIG. 3, a sample (303) is irradiated with a particle beam (302) generated from a particle beam source (301). As a result, the particle beam passing through the sample (303) is detected by a plate-shaped detection device (304) including planarly arranged particle beam detectors. At detection, the incoming particle beam is scattered by causing interference with the sample to create a circular scattering pattern (305) on the detection device (304). The scattering pattern (305) contains information on microstructure of the sample, and therefore additional processing is performed on the scattering pattern (305) to allow calculation of size distribution of scattering bodies in the sample (such as grain size distribution and/or the like). It is noted that Example 1 deals mainly with a neutron beam as the particle beam, but the particle beam to be applied may be any particle beam such as photon (γ beam, X beam), electron, proton, or the like, and the same holds true even for the case of having special properties, e.g., a phase matching property, such as laser light. It should be understood that the experiment is provided by way of illustration only and the present invention may be applied as long as it is a scattering experiment having similar principles.

Figure 4:
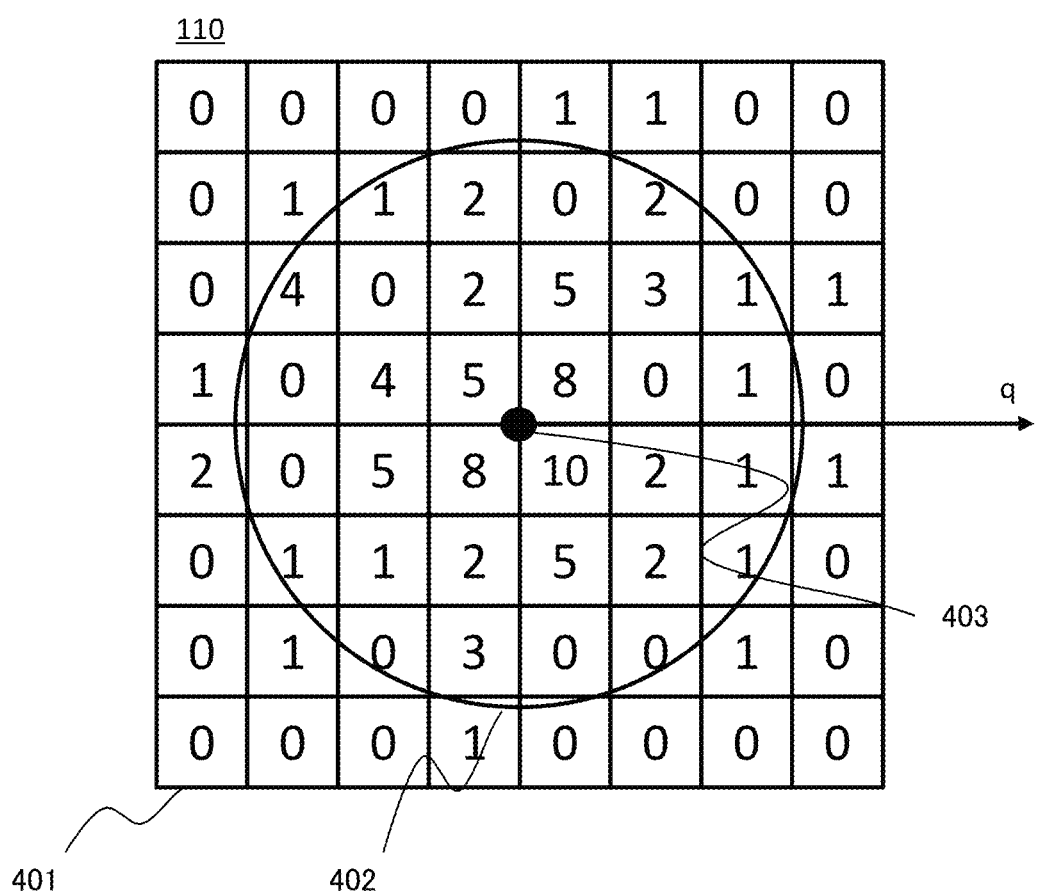
FIG. 4 is a conceptual diagram of particle beam experiment data according to Example 1.

FIG. 4 illustrates a conceptual diagram of particle beam experiment data (110) analyzed by the device. In FIG. 4, rectangles (401) are arranged in a grid fashion, in which they represent the particle beam detectors and a numeric value in each rectangle represents count of particles. Well-known techniques may be adopted for the configuration of the particle beam detector, in which, for example, an incoming particle is detected as an electric signal. The data obtained by detecting the scattering result takes a circle (402) with a grid fashion, in which the count has a tendency to increase as being located closer to the center (403) of the circle and to reduce as being farther away from the center (403). Because the data is represented as a kind of image, the count may be referred to as a luminance value likened to images.

Figure 5:
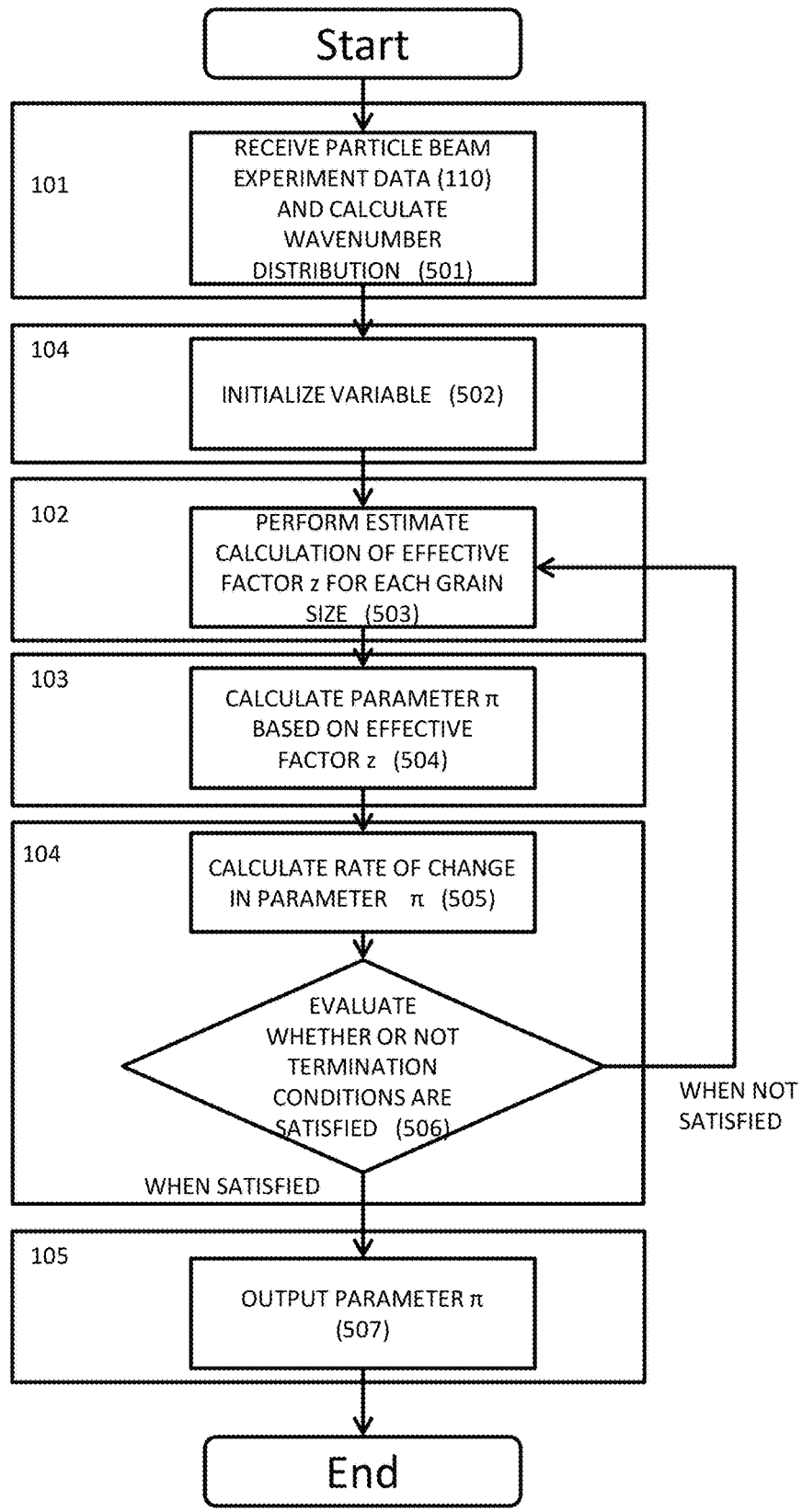
FIG. 5 is a flow diagram of processing according to Example 1.

FIG. 5 schematically illustrates as (501) to (507) the operation flow according to Example 1. Initially, in initial processing (501), the particle beam experiment data (110) is input to the particle beam experiment data analysis device (100), which is in turn converted to a wavenumber distribution by the count distribution data acceptance section (101) which then passes the resultant wavenumber distribution to the spatial parameter accuracy improvement section (104).

FIG. 6 illustrates an example of data structures (600) for the particle beam experiment data (110). The particle beam experiment data (110) is data having: a predetermined experiment ID (601) previously assigned to an experiment for identification; a detector ID (603) indicating a predetermined identifier corresponding to each rectangle (401); and a count (604) which is the number of times the corresponding detector detects a particle beam. The particle beam experiment data has as many data structures (600) as the number of detectors are provided, for a single experiment ID (601).

A wavenumber q is a value obtained by dividing the particle oscillation frequency by $2\pi$. A distance from the center ((403) in FIG. 4) of the particle beam in each detector corresponds to a particle wavenumber. Based on this, the wavenumber q may be determined by a well-known calculation method. At this stage, only the wavenumber along specific section passing through the center ((403) in FIG. 4) of the particle beam may be handled. Alternatively, as long as it is clear that a sample has no anisotropy, a value of integral of the perimeter of a circle centered around the center ((403) in FIG. 4) of a particle beam may be used to improve the accuracy. The integration may be performed by simply adding a count of the detector corresponding to wavenumber. This approach is adopted in Example 1.

Also, well-known polynomial interpolation may be used to estimate an approximate expression of a count distribution of the detectors and a well-known method of resampling (conversion of a signal sampled in one series of sample points to a signal sampled in another series of sample points) may be used to perform correction to achieve regular intervals of wavenumbers. In this manner, a function of performing resampling upon reception of scattering pattern for conversion to the number of particle beam sensing events for each predetermined wavenumber is provided, so that the interaction estimation section (102) estimates interaction based on the resampling result, making it possible to expect improved accuracy.

FIG. 7 illustrates an example of data structures (700) for calculation results of the processing (501). Wavenumber distribution data is data having: an experiment ID (701)

which is duplication of the experiment ID (601); wavenumbers (702) calculated in the above; and count values (703) corresponding the wavenumbers. It is noted that in Example 1 the processing (501) is executed by the particle beam experiment data analysis device (100), but the data corresponding to the data structure (700) may be received as a result of previously executing equivalent processing.

In most cases, for a single experiment ID (701), as much data structures (700) as the number of detectors are provided. If a sample has isotropy, the number of data structures (700) can be reduced. In Example 1, the particle beam experiment data (110) is integrated circumferentially to create a wavenumber distribution, so that the number of data structures (700) results in the number corresponding to a distance from the center ((403) in FIG. 4) of the particle beam. Also, resampling enables reconfiguration into any number of data structures (700).

Subsequently, in processing (502), the spatial parameter accuracy improvement section (104) initializes data. FIGS. 8 and 9 illustrate the structure of data used.

FIG. 8 is an example of data structures (800) for grain size selection probability. The data is data having: an experiment ID (801) which is duplication of the experiment ID (601); a predetermined grain size value (802) which is a target for the estimation of grain size distribution; and selection probability $\pi$ (803) for the same. The selection probability $\pi$ (803) of them may be determined randomly in the initial state or may be a uniform value. However, the selection probability $\pi$ (803) is required to be a non-negative value, in which, because of probability, the sum with respect to all $\pi$ becomes one. For a single experiment ID (801), as much data structures (800) as the number of grain size values with predetermined intervals are provided.

FIG. 9 illustrates an example of data structures (900) for expected values of the number of times that scattering occurs. The data on the expected values of the number of times that scattering occurs has: an experiment ID (901) which is duplication of the experiment ID (601); a grain size (902) which is duplication of the grain size value (802); and an expected value z (903) of the number of times that scattering occurs in the grain radius. Because the expected value z (903) of the number of times that scattering occurs is substituted in the following processing, any value such as a random value, a constant, or the like may be stored as an initial value. For a single experiment ID (901), as much data structures (900) as the number of grain size values are provided.

Then, the spatial parameter accuracy improvement section (104) first executes processing (503) to cause the interaction estimation section (102) to estimate an expected value z (903) of the number of times that scattering occurs, and then executes processing (504) to cause the parameter distribution calculation section (103) to calculate a selection probability $\pi$ (803).

The spatial parameter accuracy improvement section (104) calculates the amount of change in selection probability $\pi$ (803) updated by the two processing stages, and in turn determines whether or not the condition of terminating the processing is satisfied (506). The calculation of the amount of change is determined by obtaining a rate of change between the previous selection probability $\pi$ (803) and the current selection probability $\pi$ (803). For this determination, any method may be employed as long as the change can be correctly determined, and, for example, a method may be used in which the sum of squares of differences between selection probabilities of each grain size is obtained and divided by the average of the selection probabilities of each grain size. It is noted that the determination of termination condition should enable a judgment of sufficient convergence, and, in an example method, a determination may be made from the number of times as to whether or not execution is repeatedly performed for a sufficient number of iterations.

Conventionally, all combinations of the selection probabilities $\pi$ and the grain sizes r are examined to find patterns matching the wavenumbers q, thereby estimating $\pi$ and r. However, Example 1 is featured in that the probability p(q) calculated in a deterministic manner is used to estimate $\pi$ and r. The principle of the calculation is described with reference to FIGS. 10, 11, and 12.

FIG. 10 schematically illustrates a process of the scattering experiment. Particles emitted from the particle beam source (1001) are scattered in one selected from grain radius distributions (1002) of a sample, and are detected on one of wavenumber distributions (1003). The arrows (1004, 1005) in FIG. 10 indicate a path of a particle, in which, initially, a grain size rn is selected as a scattering subject (1004), and then a wavenumber qi on the wavenumber distribution is selected (1005). Here, a probability that the grain size rn is selected corresponds to a selection probability $\pi$ (803). Also, if a probability that particles scattered in the grain size rn select a wavenumber qi is written as P(qi|rn), this is known to be proportional to I(r,q) shown in Equation 1.

$$I(r, q) = \left(\frac{\sin qr}{q^3} - \frac{r \cos qr}{q^2}\right)^2 \qquad \text{Equation 1}$$

$$P(q_i | r_m) = \frac{I(q_i | r_m)}{\sum_n I(q_i | r_n)}$$

The particles sensed in a certain wavenumber q is the total particles scattered in each grain size rn and having the same wavenumber. A q observable range is finite, but P(qi|rn) can be described as a conditional probability value under the conditions that "particles are scattered in a q observable range", by the division by a value of integral (or sum) within the observation range. The P(qi|rn) may be interpreted as a posterior probability on the precondition of rn in Bayesian statistics. On the presumption, the probability P(qi) that particles are sensed in a certain wavenumber qi can be obtained as sum with respect to all grain sizes.

This is schematically illustrated in FIG. 11. For combinations (1101) in terms of all grain sizes available from the particle beam source (1001), the selection probability $\pi$i is multiplied and added, and thus a selection probability P(qi) of a wavenumber qi can be calculated as in Equation (1102). Under the presumption of Equation (1102), the process of determining a selection probability $\pi$ (803) from a wavenumber distribution (1003) obtained through an experiment is illustrated in FIG. 12.

Figure 12:
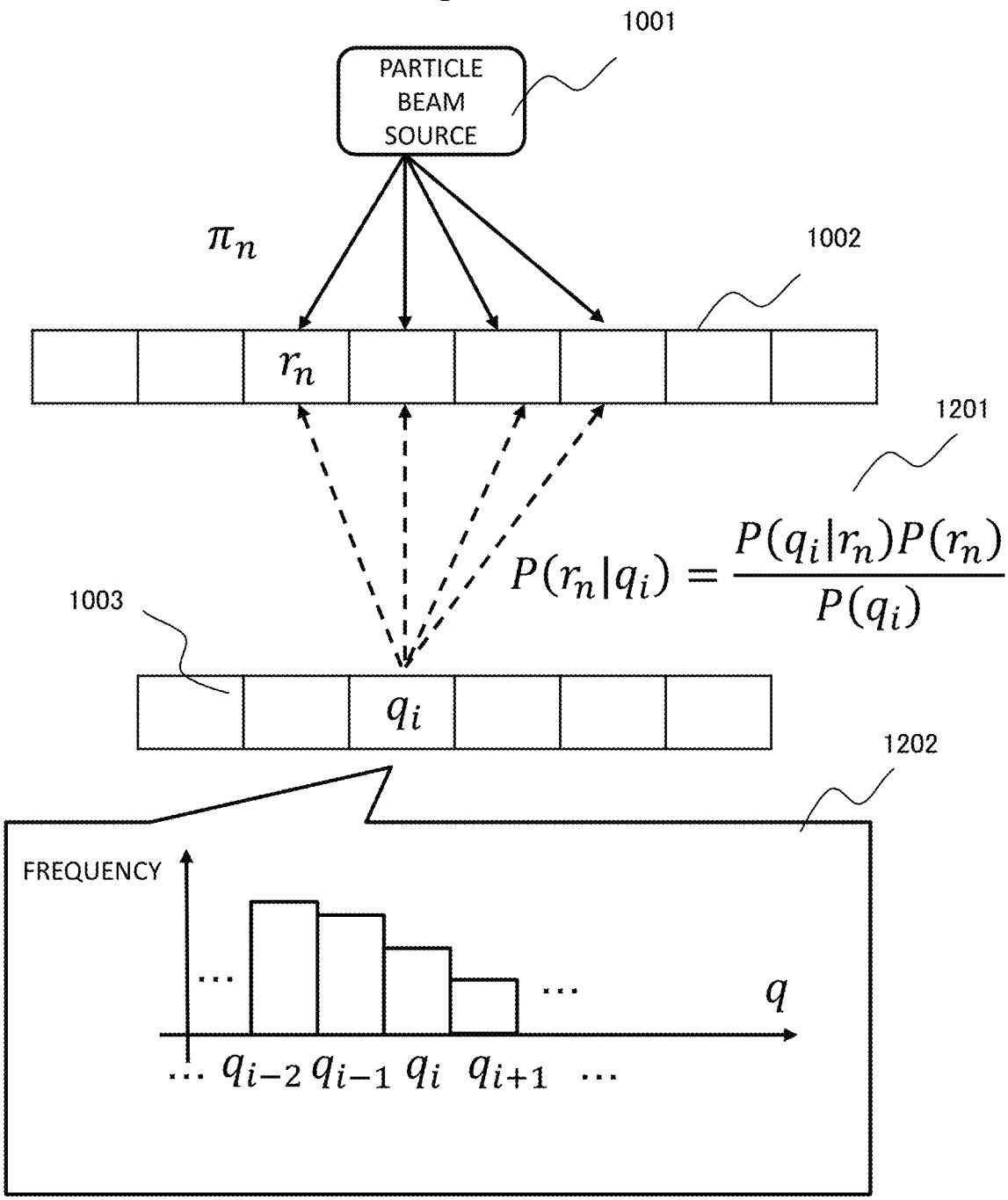
FIG. 12 is a principle schematic diagram (part 3) according to Example 1.

As illustrated in FIG. 12, when the particles are sensed in a certain wavenumber qi, a probability distribution indicating what grain size the particles are scattered in is described as P(rn|qi) in Bayesian statistics notation, but this may be transformed to Equation (1201) using P(qi|rn) by applying well-known Bayes theorem to this. P(rn) in the equation corresponds to the selection probability $\pi$ (803) and a selection probability P(qi) of wavenumber qi may be calculated through the above equation (1102). Therefore, the probability that particles sensed in a certain wavenumber qi are scattered in grain size rn results in zin in Equation 2.

$$z_{in} = \frac{\pi_n P(q_i | r_n)}{\sum_m \pi_m P(q_i | r_m)} \qquad \text{Equation 2}$$

When the zin is multiplied by a corresponding count (1202) (corresponding to a count value (703) in FIG. 7), this results in an expected value of the number of times that scattering occurs, for each grain size when the particle beam experiment data (110) is obtained. This may be set as an expected value z (903) of the number of times that scattering occurs in FIG. 9. The processing (503) in the interaction estimation section (102) corresponds to the above processing. As a consequence, data z on the expected value of the number of times that scattering occurs (data structure (900)) is obtained. Because it can be easily surmised that the expected value of the number of times that scattering occurs is proportional to the selection probability π (803), the expected value of the number of times that scattering occurs may be normalized such that the sum becomes one, and the selection probability π (803) may be updated by an expression shown in Equation 3. The procedure corresponds to the processing (505) to calculate the selection probability π (803) in the parameter distribution calculation section (103).

$$\pi_n = \frac{\sum_j c_j z_{jn}}{\sum_{im} c_i z_{im}} \qquad \text{Equation 3}$$

In the process, the selection probability π (803) is used in the interaction estimation section (102) to determine the expected value z (903) of the number of times that scattering occurs, and the expected value z (903) of the number of times that scattering occurs is used in the parameter distribution calculation section (103) to determine the selection probability π (803). The selection probability π (803) and the expected value z (903) of the number of times that scattering occurs should agree with each other, and are repeatedly calculated alternately to converge, so that elimination of inconsistency is expected. Thus, if a value causing π or z to converge is found, the value will reflect a state of the sample.

Figure 13:
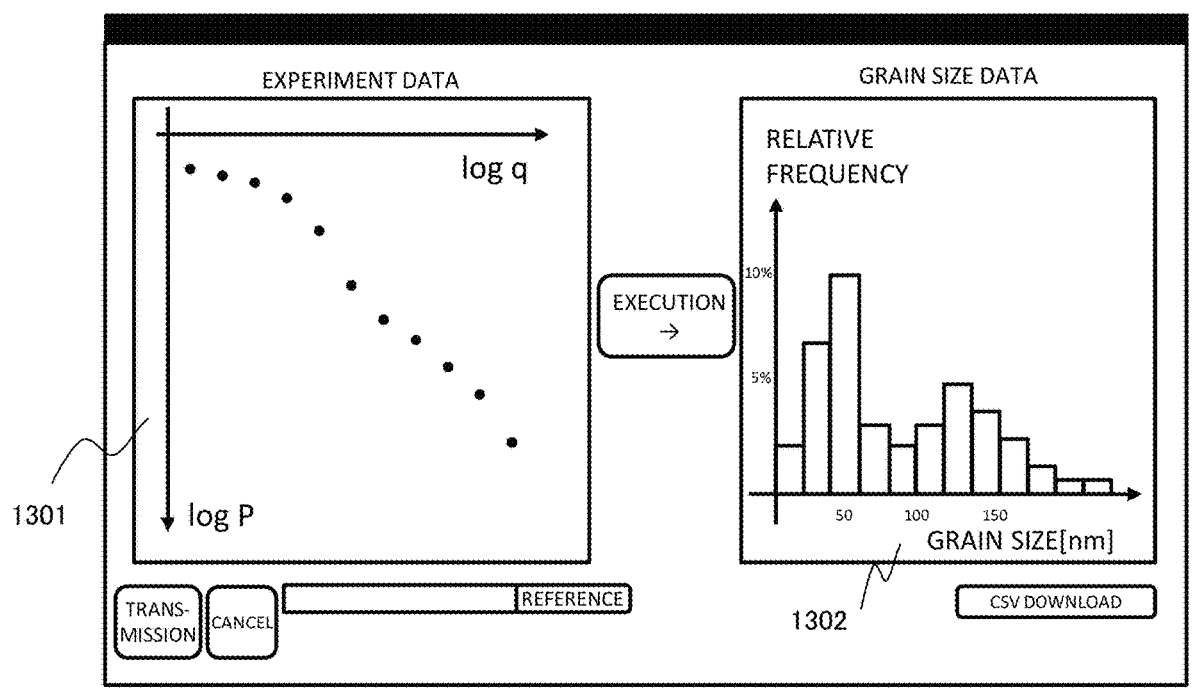
FIG. 13 is a plan view of an example of display screens according to Example 1.

FIG. 13 illustrates an example of input/output screens of the particle beam experiment data analysis device (100). This example includes a screen (1301) to present wavenumber distribution data (FIG. 7) obtained from incoming particle beam experiment data (110), and a screen (1302) to present grain size data estimated using the information, in which analysis results are configured to be provided.

The screen (1301) presenting the wavenumber distribution data displays a logarithm of wavenumber (or distance from the particle beam center (403)) on the horizontal axis, and a logarithm of a cumulative total of counts on the vertical axis. The screen (1302) presenting the grain size data displays a result of the processing (507) by the microspatial distribution data output section (105), in which the horizontal axis indicates grain size (nm) and the vertical axis indicates a relative frequency with which scattering occurs in the grain size (corresponding to the distribution of grain sizes constituting a sample). It is noted that this is merely illustrative, and a mechanism for direct entry from experiment equipment without passing through the screen or the like may be added and/or grain size data may be transmitted to another analysis device.

According to the above example embodiment, the grain size is calculated simply by populating data without the requirement for specific knowledge about analysis. Thus, improved convenience in terms of analysis of scattering experiment data is achieved.

It is noted that the example embodiment will be facilitated being applied to situations that require inverse estimation analyses in the case where a measurement object is not easily measured directly but can be measured as a frequency signal, such as a nondestructive inspection in which ultrasonic waves, rather than particle beam, are incident on a measurement object and the reflection is frequency analyzed, an earthquake source estimation based on frequency analysis of earthquake motion, and the like.

Example 2

Figure 14:
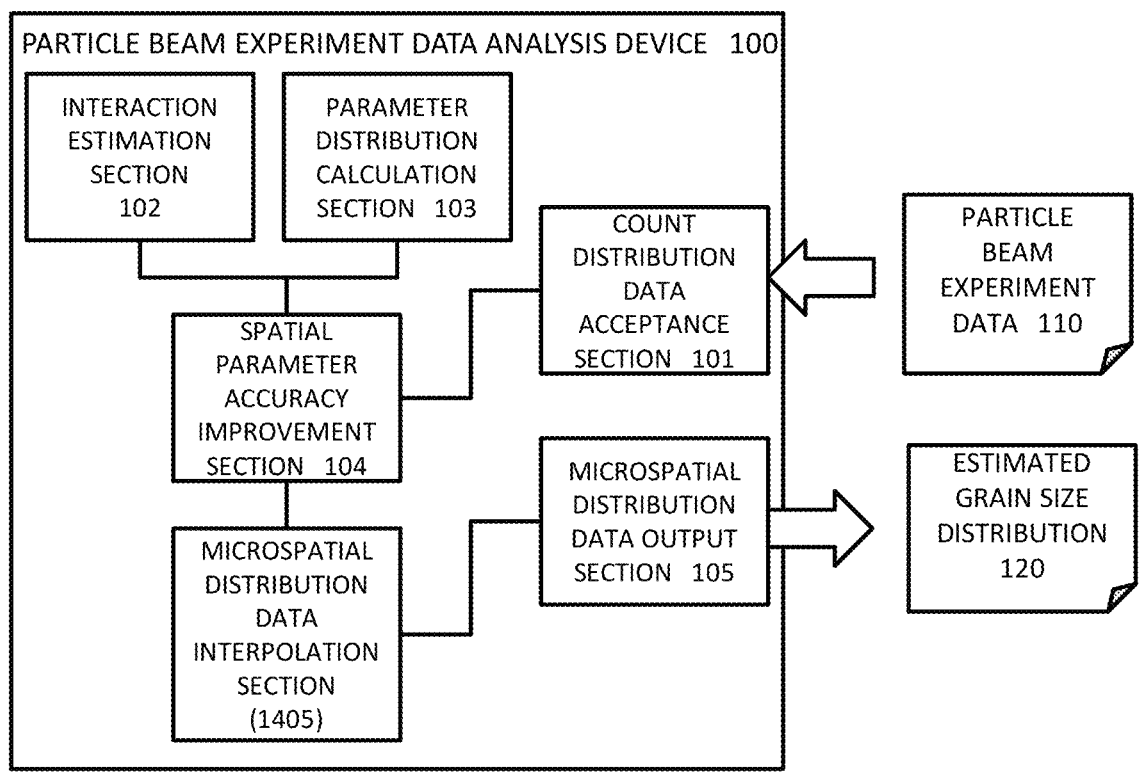
FIG. 14 is a function block diagram illustrating configuration overview according to Example 2.

FIG. 14 illustrates an example configuration according to Example 2 of embodiments. Example 2 relates to a device assuming that the particle beam experiment data (110) received by the particle beam experiment data analysis device (100) is anisotropic, i.e., has grain size distribution varying depending on orientation.

Figure 15:
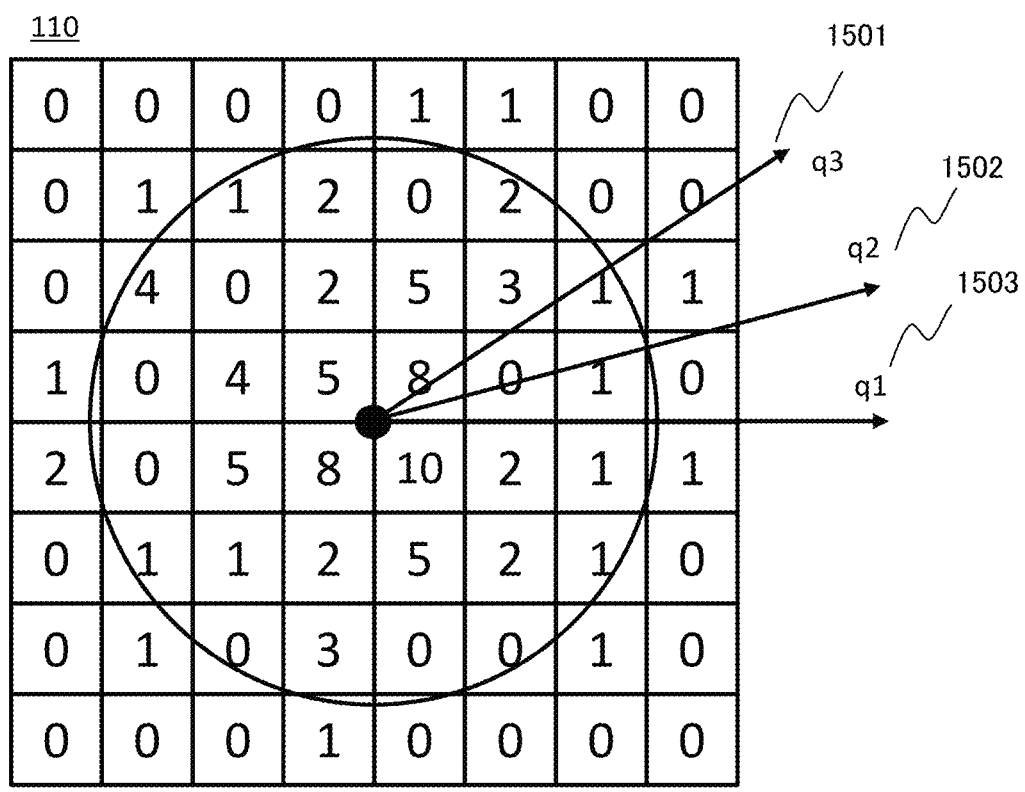
FIG. 15 is a conceptual diagram of particle beam experiment data according Example 2.

FIG. 15 illustrates a conceptual diagram of the particle beam experiment data (110) with anisotropy. In Example 1, on the assumption that a sample has isotropy, the particle beam experiment data (110) is integrated circumferentially to create a wavenumber distribution. However, in Example 2, this is determined from a plurality of angles, and a grain size distribution is estimated for each angle as shown by (401), (402), (403) in FIG. 15. A microspatial distribution data interpolation section (1405) merges the distributions to create two-dimensional structure, thereby being capable of adapting to a sample with anisotropy.

Figure 16:
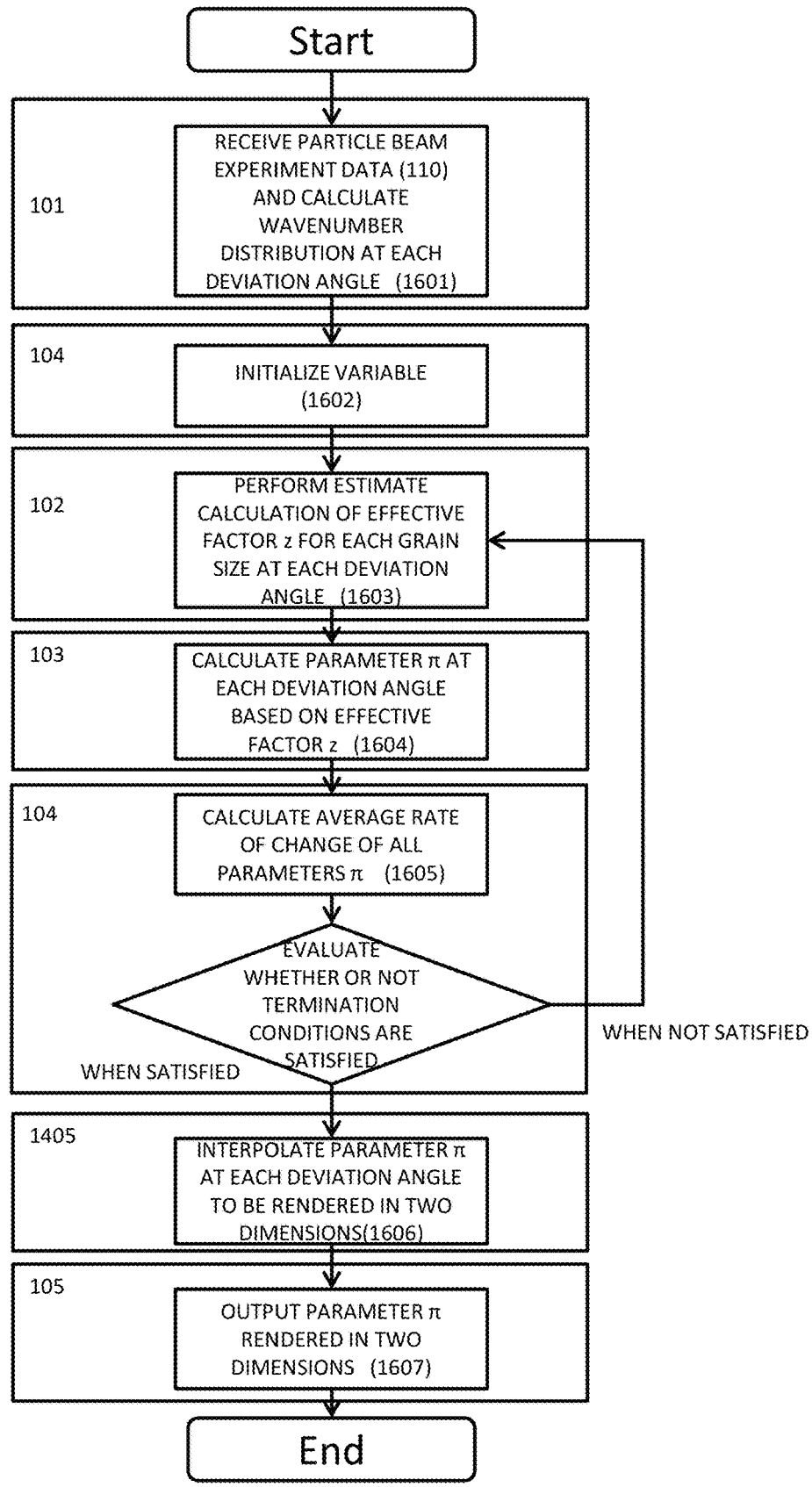
FIG. 16 is a flow diagram of processing according to Example 2.

FIG. 16 schematically illustrates an operation flow according to Example 2. A difference of the flow from Example 1 is in that each processing stage includes a calculation for each deviation angle. In initial processing (1601), the count distribution data acceptance section (101) performs conversion to a wavenumber distribution for each deviation angle and passes the resultant to the spatial parameter accuracy improvement section (104).

FIG. 17 illustrates an example (1700) of data structures of a calculation result in the processing (1601). A difference from Example 1 is in that, because of a calculation in the processing (1601) made for each deviation angle, the data which is the calculation result includes the deviation angle (1701). Then, the spatial parameter accuracy improvement section (104) initializes the data (1602).

The data structure (1700) (1800) used are illustrated in FIGS. 18 and 19. In this respect, a difference from Example 1 is in that the deviation angles (1801) (1901) are included. The number of data pieces is obtained by multiplying the number of data pieces in Example 1 by the number of deviation angles.

The spatial parameter accuracy improvement section (104) executes processing (1603) to cause the interaction estimation section (102) to estimate, at each deviation angle, an expected value z (903) of the number times that scattering occurs, and then causes the parameter distribution calculation section (103) to execute processing (1604) to calculate a selection probability π (803). The spatial parameter accuracy improvement section (104) calculates the amount of change in selection probability π (803) updated through the two processing stages, and determines whether or not conditions for terminating the processing are satisfied (506). The calculation of the amount of change is made similarly to Example 1, but aggregation of the calculations for individual deviation angles is required. For example, an average rate of change in terms of all deviation angles may be determined. It is noted that the determination of the termination conditions may be made for each deviation angle, calculations may be omitted for deviation angles after sufficient convergence is reached, and/or the like.

After the conversion is completed, based on a parameter $\pi$ at each deviation angle, the microspatial distribution data interpolation section (1405) resamples the $\pi$ distribution in the two-dimensional plane (1606). For this processing, any method may be used as long as it is capable of interpolating a curved surface, for example, a well-known spline approximation method. Alternatively, if a well-known nonlinear regression analysis is used to obtain $\pi=f(x,y)$ as a function of $\pi$ before the resampling method is performed, a more highly accurate distribution calculation can be provided.

The microspatial distribution data output section (105) outputs the result of the interpolation processing by the microspatial distribution data interpolation section (1405) (1607).

Figure 20:
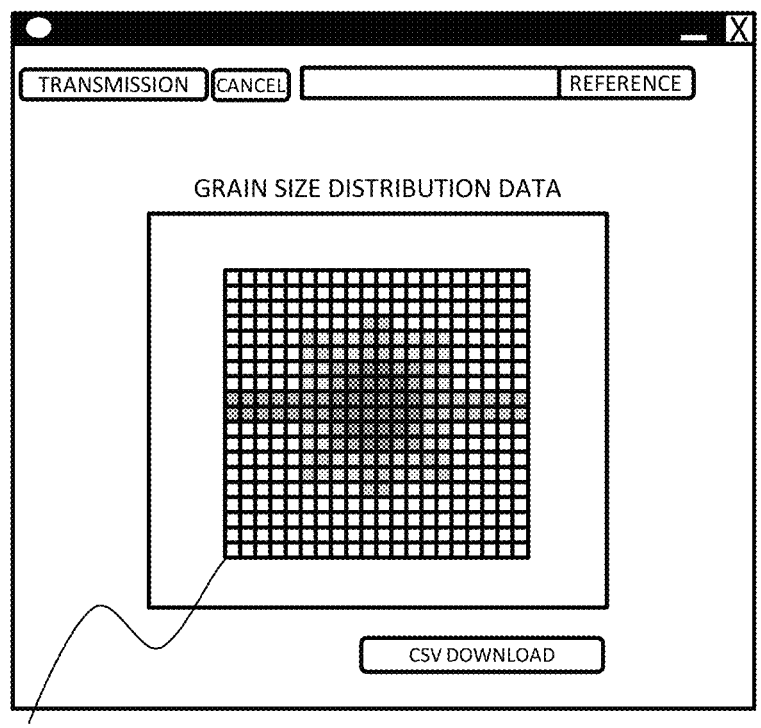
FIG. 20 is a plan view of an example of display screens according to Example 2.

FIG. 20 illustrates an example of the display. Because the estimation result is two-dimensional space, the grain size distributions are also displayed in plane in different colors according to the occurrence frequency (2001). The user can validate the measurement based on the result, and perform a more detailed analysis as necessary. According to Example 2, performing proper analyses on a sample with anisotropy is enabled.

As detailed above, conventionally a nanometer scale grain size cannot be measured directly, and therefore is projected to wavenumber space for measurement through scattering experiment. However, this is a complicated process due to the quantum theoretical wave nature, and a back calculation from the wavenumber space has been difficult. However, using the techniques described in example embodiments, the process of scattering of particles is reduced to the probability process of each particle selecting a scattering subject, and the expected value calculation for the scattering subject and the optimization of a selection probability parameter for the scattering subject are repeatedly performed. Thereby, a selection probability parameter for the scattering subject to maximize a likelihood can be obtained, which then be output as a grain size distribution. As a result, in the calculation of microspatial structure of a sample based on the scattering experiment, the parameter has no arbitrariness and is objectively determinable. Therefore, a quick and accurate estimation of a distribution of spatial structure can be expected.

INDUSTRIAL APPLICABILITY

The present invention is applicable to analyses of experiment results using particle beams.

REFERENCE SIGNS LIST

100 . . . particle beam experiment data analysis device
102 . . . interaction estimation section
103 . . . parameter distribution calculation section
104 . . . spatial parameter accuracy improvement section
110 . . . particle beam experiment data

The invention claimed is:

1. A particle beam measurement results analysis device to calculate a spatial parameter distribution representing spatial structure of a sample based on a scattering pattern corresponding to projection of the spatial structure of the sample to wavenumber space, the projection being obtained by detecting scattering of a particle beam which enters the sample and intersects with the sample, the device comprising:
   an interaction estimation section to provide estimates for signals on the scattering pattern in association with at which point on a spatial parameter distribution of the sample interactions occur during scattering;
   a parameter distribution calculation section to aggregate estimation results of the interaction estimation section to calculate a spatial parameter distribution of a sample matching an aggregated result; and
   a spatial parameter accuracy improvement calculation section to perform alternately and repeatedly estimation in the interaction estimation section and calculation in the parameter distribution calculation section in order to improve estimation accuracy in spatial parameter distributions.

2. The particle beam measurement results analysis device according to claim 1, further comprising a function of performing resampling upon reception of a scattering pattern for conversion to the number of particle beam sensing events for each predetermined wavenumber,
   wherein the interaction estimation section estimates interaction based on a result of the resampling.

3. The particle beam measurement results analysis device according to claim 2, further comprising:
   a function of performing, upon reception of a two-dimensional scattering pattern, the resampling at each deviation angle on the scattering pattern for conversion to the number of particle beam sensing events for each predetermined wavenumber; and
   a microspatial distribution data interpolation section having a function of interpolating a spatial parameter distribution at the each deviation angle to determine a two-dimensional spatial parameter distribution.

4. The particle beam measurement results analysis device according to claim 1,
   wherein the spatial parameter accuracy improvement calculation section calls alternately and repeatedly estimation in the interaction estimation section and calculation in the parameter distribution calculation section until a rate of change in parameter distribution falls below a predetermined threshold.

5. The particle beam measurement results analysis device according to claim 1,
   wherein the spatial parameter accuracy improvement calculation section calls alternately and repeatedly estimation in the interaction estimation section and calculation in the parameter distribution calculation section until a predetermined number of callings is reached.

6. The particle beam measurement results analysis device according to claim 1,
   wherein the interaction estimation section estimates an expected value z of a number of times that scattering occurs, for each predetermined grain size, and
   the parameter distribution calculation section calculates a selection probability $\pi$ of occurrence of scattering for the each grain size.

7. The particle beam measurement results analysis device according to claim 6,
   wherein the interaction estimation section estimates the expected value z using the selection probability $\pi$, and the parameter distribution calculation section calculates the selection probability $\pi$ using the expected value z.

8. A particle beam measurement results analysis method executed by an information processing device, comprising:

a first step of generating observation data from experiment data obtained from scattered particles observed after a particle beam enters a sample;

a second step of calculating an expected value z of a number of times that scattering occurs, for each grain size r by use of the observation data and a selection probability $\pi$ which is a probability of selecting a grain size r in which the scattered particles are scattered; and a third step of calculating the selection probability $\pi$ by use of the expected value z, wherein the second step and the third step are repeated.

9. The particle beam measurement results analysis method according to claim 8, wherein the selection probability $\pi$ and the expected value z are given arbitrary values as initial values, and one of the selection probability $\pi$ and the expected value z converges by repeatedly performing the second step and the third step and an analysis is terminated.

10. The particle beam measurement results analysis method according to claim 8, wherein the second step and the third step are repeated for a predetermined number of times in order to terminate an analysis.

11. The particle beam measurement results analysis method according to claim 8, wherein in the first step, wavenumber distribution data is generated as observation data by calculating, from the experiment data, a distribution of wavenumber q of scattered particles.

12. The particle beam measurement results analysis method according to claim 8, wherein in the third step, the expected value z is normalized to determine the selection probability $\pi$.

* * * * *